United States Patent [19]

McNaughtan, deceased et al.

[11] 4,070,912

[45] Jan. 31, 1978

[54] TEMPERATURE INDICATING COMPOSITIONS AND DEVICES

[76] Inventors: Thomas J. McNaughtan, deceased, late of Malvern, Pa., by Jerry McClintock, executor, R.R. 2, Box 183C, Fortville, Ind. 46040

[21] Appl. No.: 618,592

[22] Filed: Oct. 1, 1975

[51] Int. Cl.$^2$ .................. C09K 3/34; G01K 11/16; C09D 11/10

[52] U.S. Cl. .................. 73/356; 23/230 LC; 252/299; 252/408; 428/1; 116/114 Y; 106/19; 106/20

[58] Field of Search .................. 252/299, 408; 428/1; 23/230 LC; 73/356; 116/114 Y; 106/19, 20

[56] References Cited

U.S. PATENT DOCUMENTS

| | | | |
|---|---|---|---|
| 3,576,761 | 4/1971 | Davis | 252/299 |
| 3,600,060 | 8/1971 | Churchill et al. | 252/299 |
| 3,617,374 | 11/1971 | Hodson et al. | 252/299 |
| 3,619,254 | 11/1971 | Davis | 252/299 |
| 3,620,889 | 11/1971 | Baltzer | 252/299 |
| 3,633,425 | 1/1972 | Sanford | 252/299 |
| 3,661,142 | 5/1972 | Flam | 252/299 |
| 3,826,141 | 7/1974 | Pickett et al. | 252/408 LC |
| 3,871,232 | 3/1975 | Pickett et al. | 73/356 |
| 3,885,982 | 5/1975 | Fergason | 252/299 |
| 3,898,354 | 8/1975 | Parker | 73/356 |
| 3,929,021 | 12/1975 | Pecorella | 73/356 |
| 3,969,264 | 7/1976 | Davis | 252/299 |
| 3,974,317 | 8/1976 | Sharple ss | 252/299 |

*Primary Examiner*—Benjamin R. Padgett
*Assistant Examiner*—T. S. Gron
*Attorney, Agent, or Firm*—Thomas M. Ferrill, Jr.

[57] ABSTRACT

Polymeric mixtures of a cholesterol material and a monomer are disclosed which can advantageously be utilized for the construction of temperature indicating devices. Each polymeric composition exhibits a color at temperatures below a fixed threshold temperature and then appears colorless at the threshold temperature. This characteristic permits safe, compact, accurate, fast responsive, disposable temperature indicating and warning devices to be made.

6 Claims, 8 Drawing Figures

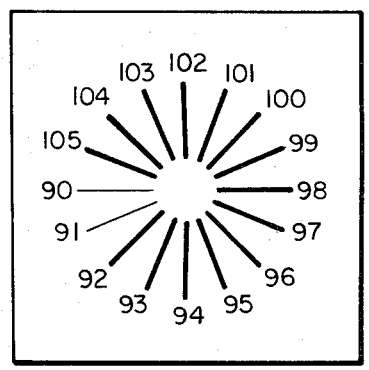 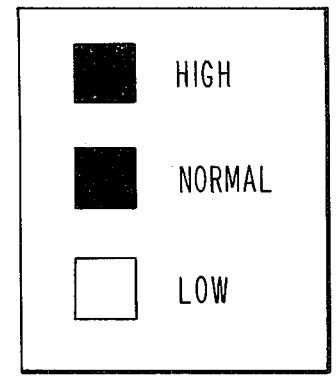
Fig. 5　　　　　　　　Fig. 6
| 66 67 68 69 70 71 72 73 74 75 |
Fig. 7

TEMPERATURE INDICATING COMPOSITIONS AND DEVICES

FIELD OF THE INVENTION

The present invention relates to polymeric cholesteric compositions which are responsive to temperature change and, more particularly, to such temperature indicating compositions which are readily printable to form temperature indicating devices such as oral thermometers.

BACKGROUND OF THE INVENTION

A standard thermometer for clinical use has long been the mercury thermometer simply because there was no really effective substitute. The disadvantages of such thermometers are well known. Mercury thermometers are unsafe because they are easily breakable, because they contain mercury, a poison, and because of the inherent perils in adequately sterilizing such thermometers so as to prevent cross contamination. Children's wards, epileptic wards, and contagious wards are places where sterility and contamination are especially critical with respect to temperature measuring devices. In addition to these dangers, conventional clinical thermometers are slow to register temperatures, are difficult to read, and require considerable time for the taking and reading of such temperatures as well as for the storage, handling and sterilization thereof.

With increasing costs of operating hospitals, including the increasing cost and the short supply of adequately trained nurses and other personnel, it is most desirable to reduce the time which must be spent in routine matters such as monitoring each patient's body temperature. This saving in time, can be accomplished by eliminating the present method of reading the patient's temperature. Another advantage of eliminating conventional temperature detecting techniques involves certain seriously ill patients for whom the use of oral thermometers is impractical because they will not or cannot keep their mouths closed for the required period of time necessary to obtain a response.

Efforts have been made to find effective substitutes for the standard mercury thermometer. It has been known that certain organic chemicals, including many cholesteric liquid crystals, have the property of changing color with temperature, and it has been suggested that such materials be used for the purpose of analyzing temperature changes. However, no really simple economical and reliable device has been developed for general use in hospital wards to date.

Cholesterol compounds are essentially medium molecular weight monomeric materials having layers of reflective crystalline structure. Three classes of liquid crystals have been designated as (1) nematic, characterized by thread like molecules that tend to be and remain in nearly parallel orientation; (2) smectic, characterized by its molecules being arranged in layers with the long axis approximately normal to the plane of the layers; and (3) cholesteric, characterized by its molecules being arranged in an ordered spiral configuration. The unique molecular architecture of cholesteric liquid crystals gives rise to a number of peculiar optical properties. When ordinary white light is directed at a cholesteric material, the light is separated into two components, one with a vector rotating clockwise and the other with a vector rotating counterclockwise. Depending on the material, one of these components is transmitted and the other is reflected. It is this property that gives the cholesteric phase its characteristic iridescent color when it is illuminated by white light. The particular combination of colors depends on the material, the temperature and the angle of the incident beam.

One approach for using these liquid crystals has been to provide a thermometer having a plurality of chambers containing different chemical compositions which change appearance in response to various temperature conditions. Efforts to encapsulate these chemical compositions have resulted in a rather bulky thermometer and consequently a thermometer in which it is difficult to expose the multiple temperature sensing points to exactly the same temperature. In addition, care must be taken that a patient does not penetrate the chambers by biting down on the encapsulating material while a thermometer is in the patient's mouth.

Monomeric liquid crystals of cholesterol compounds also tend to be greasy, oily materials which cannot be printed readily without smearing or distorting letters and/or numbers. Thus, while there have been attempts to utilize such materials in the preparation of temperature indicating devices smearing and distortion accompanying the use of such materials have constituted recognized and significant problems, preventing widespread acceptance.

SUMMARY OF THE INVENTION

An object of this invention is to provide a temperature indicator or device which exhibits a color change at one or more predetermined temperatures.

Another object of the present invention is to prepare printable cholesteric compositions.

Still another object of the present invention is to provide safe, compact, accurate, inexpensive temperature indicating devices.

An object of the present invention is to provide a disposable clinical temperature sensing device which overcomes shortcomings of clinical thermometers of the glass-mercury type.

Another object of the present invention is to provide a rapid temperature sensing device which is safe and reliable for use with people of all ages.

A further object of the present invention is to provide a temperature indicating device which is made of unbreakable and pliable material such that the device will not injure a patient even if pressure is applied against the device by the patient.

Still another object of the present invention is to provide a temperature indicating device which provides a graphic reading so that the user can quickly and easily ascertain a patient's temperature.

In accordance with the present invention polymeric mixtures of a cholesterol compound and monomer are formed as temperature indicating compositions which are readily printable upon being dissolved in a suitable solvent. Specifically, the compositions of the present invention comprise a mixture of a cholesterol material and a monomer. A preferred monomer is an ester formed by mixing a carboxylic acid with an alcohol. The printed compositions change from a state of reflecting a color to a substantially colorless or non-reflective state upon reaching a particular temperature. The compositions revert to their original color when subjected to a lower temperature. Advantageously the compositions are used to manufacture temperature indicating devices such as oral thermometers.

BRIEF DESCRIPTION OF THE DRAWINGS

Other and further objects, advantages and features of the invention will be apparent to those skilled in the art from the following detailed description thereof, taken in conjunction with the accompanying drawings, in which:

FIG. 5 is a highly schematic drawing of another form of temperature indicating device in which lines radiating from the center of a wheel indicate temperature conditions;

FIG. 6 is a highly schematic drawing of a simplified temperature indicating device for quickly determining conditions of temperature normality; and FIG. 7 is a highly schematic drawing of a temperature indicating bar device of a type which can be used for indicating room temperature conditions.

DESCRIPTION OF THE PREFERRED EMBODIMENTS

Figure 1:
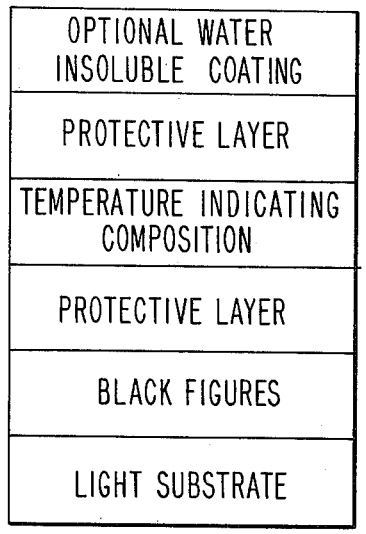
FIG. 1 is a graphical illustration of a temperature indicating composition of the present invention applied to a light colored substrate.
Figure 2:
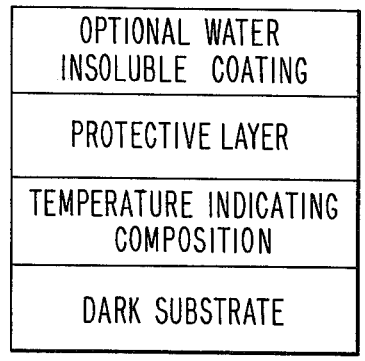
FIG. 2 is a graphical representation of a temperature indicating composition of the present invention applied to a dark colored substrate.

FIGS. 1 and 2 illustrate preferred arrangements for applying the temperature indicating compositions of the present invention to selected substrates. These compositions are prepared by polymerizing a cholesteric material and a monomer. The preferred monomer is an ester.

Among the various cholesteric materials which can be used are the following: cholesteryl acetate, cholesteryl allyl carbonate, cholesteryl benzoate, cholesteryl caproate, cholesteryl malonate, cholesteryl cinnamate, cholesteryl ethyl carbonate, cholesteryl butyrate, cholesteryl propyl carbonate, cholesteryl palmitate, cholesteryl oleate, cholesteryl octanoate, cholesteryl methyl carbonate, cholesteryl propionate, cholesteryl chloride, cholesteryl pelargonate, cholesteryl docosonoate, cholesteryl paranitrobenzoate, cholesteryl oleyl carbonate, cholesteryl heptyl carbonate, cholesteryl nonanoate, and cholesteryl phenyl acetate.

The ester is formed by reacting a dicarboxylic acid and an alcohol. Suitable dicarboxylic acids include maleic, fumaric, citraconic, mesaconic, and the like. Mono and polyhydric alcohols with 1 to 24 and preferably 1 to 6 carbon atoms are utilized with such acids to form the esters. Suitable alcohols include diols, glycerol, pentaerythritol, dipentaerythritol, aromatic alcohols, and the like.

Other monomeric materials which can be employed in the present invention include various phenolic and hydrocarbon monomers. Mono- or polyhydric substituted and/or unsubstituted phenolic materials such as phenol, alkylphenols, cycloakyl and arylphenols, such as cresols, xylenols, butyl-, amyl-, hexyl-, octyl-, or nonylphenol, p-phenylphenol, cyclohexylphenol, polyhydric phenols such as diphenylolpropanes, diphenylolmethanes, either alone or in admixture can be used. Other suitable monomers include vinyl acetate, styrene, butadiene, isobutylene, methyl methacrylate, maleic anhydride, and the like.

The resulting polymeric cholesteric compositions can be dissolved in a solvent and then printed. While petroleum ether is a preferred solvent for use in preparing a composition which can be applied by rolling or printing, other hydrocarbon solvents can be used, including benzene, hexene, toluene, esters such as methyl acetate, ethyl acetate, propyl acetate, propyl formate, and the like, furane, ketones such as acetone, methylethyl ketone, methyl isobutyl ketone, and alcohols such as methyl alcohol, ethyl alcohol, propyl alcohol and isopropyl alcohol. These solvents, as well as others, can be used alone or in combination.

The temperature indicating compositions of the present invention yield glowing, brilliant colors even when applied in a very thin layer. For example, figures may be as thin as 0.00004 inch in thickness and still have the same vivid color as a somewhat thicker application.

As indicated in FIG. 1 it has been found that when a light substrate, such as a white substrate, is utilized that it is desirable to first print black figures on to the light substrate using, for example, a black printing ink. This permits a very clean and precise figure to be printed, obtaining excellent definition of the characters. To prevent migration problems it is preferable to have a protective layer separating the black figures and the temperature indicating composition. Since the temperature indicating compositions of the present invention are solid materials as distinguished from oily liquid crystals the compositions can be dissolved in a suitable solvent and applied without smearing. Thus the temperature indicating composition is applied by overprinting the black figures either directly or with the aforementioned protective layer applied to the black figures. It has been found desirable to apply another protective coating to cover the temperature indicating composition after it has been applied. Yet a further protective coating which is water insoluble should be applied if the ultimate use of the temperature indicating device is to be in an application subjected to moisture, such as an oral thermometer. The temperature indicating device prepared in this manner has very clear and distinct figures readable at a substantial distance even under adverse lighting conditions.

Temperature indicating devices can also be constructed using a dark or black substrate as illustrated in FIG. 2. In this type of temperature indicating device the temperature indicating composition is applied directly to the dark substrate. Advantageously, a protective coating is then applied to the temperature indicating composition with or without a further insoluble coating.

While the preferred protective coating or layer for utilization with the temperature indicating compositions of the present invention is polyvinyl alcohol it will be understood that any coating material which does not react with the temperature indicating composition and which prevents migration between layers can be utilized. It should further be understood that the protective layer does not necessarily have to be physically bonded in place. For example, the protective layer for some applications could be suitable sheet of plastic or glass which is simply held in place over the temperature indicating composition. The latter arrangement is suitable when the temperature indicating device is to be used primarily as a desk or wall thermometer.

The outer layer of the temperature indicating device serves to seal out contaminants while permitting clear read-out of an indicated temperature. A variety of transparent plastic films can be used. Films of ethylcellulose, polyvinylalcohol, polyvinylidene chloride, polyvinyl chloride and copolymers of vinyl alcohol and vinyl chloride are particularly effective for this purpose. Another example is the tape material "Temp-R-Tape" made from polyimide film with a pressure sensitive silicone adhesive. This tape is a good heat conductor, is transparent, thin, soft and moisture resistent with adhesive that does not react with chemicals used.

In the embodiment illustrated by FIG. 1 the black figures, as well as the temperature indicating composition, can be applied by conventional techniques such as printing or spraying. The protective layers can be coated by conventional means including roller coating, spraying and the like. As to the embodiment in FIG. 2, the matter of applying a black background to, for example, a plastic film is a matter of choice. Finely divided nickel can be used as well as a polyvinyl alcohol solution or an acrylic lacquer containing a black dye, black paint or carbon black.

Obviously, the choice of the substrate material, the color of the substrate, the shape of the substrate, and the thickness of the substrate will depend on the intended use. For use as an oral thermometer the substrate can be a plastic spoon which would permit the administration of medicine simultaneously with taking of the patient's temperature. It will be apparent that practically any substrate to which the temperature indicating composition can be applied can be used, including paper, cardboard, glass, ceramic, plastic and metal. Suitable plastic substrates include polyvinyl chloride films, polyolefin films such as polyethylene and polypropylene, polyethylene terephthalate, polyvinylidene chloride and polyurethane.

Mylar film is one suitable example of substrate which can be used for application of the compounds in accordance with the present invention. Using Mylar film having a thickness of about 0.0005 inch as a substrate an extremely sensitive temperature indicating device can be obtained. This type of device can be used for thermal mapping of the human body or an animal body to aid in diagnosis of abnormal conditions, such as gall bladder or kidney malfunction, blocked arteries, sprains, and a wide variety of other abnormal conditions that produce extremely small thermal changes in the body. These very thin film temperature indicating devices can be applied either by the use of pressure sensitive adhesive or other means to hold each device to a desired location.

The temperature indicating devices of the present invention, represented by FIGS. 3 through 7, can be designed to indicate almost any temperature desired. Different combinations of cholesteric substances have been used to measure temperatures ranging from minus 20° C. to plus 250° C. These substances have been fabricated into flexible films or tapes that can be applied to surfaces to record temperature gradients in several directions. This technique can be extended to the inspection of opaque materials for certain structural flaws that would conduct heat unevenly and so produce different patterns of color in a cholesteric substance applied to the surface.

For certain warning applications, for example, a simple badge (not illustrated) which indicates a single temperature condition is all that is required. For example, in cases of miners faced with heat prostration problems a badge taped to the miners providing only one temperature indication would be adequate to give necessary warning.

For oral thermometers (such as those illustrated by FIGS. 3 through 5) the desired temperature range is from about 95° to about 104° F. For room temperature measurements, temperature indication in the range of 66° to 75° F. is normally adequate (see FIG. 7).

The present invention permits temperature indicating devices to be constructed to indicate temperatures over a wide range and to be so designed as to indicate temperature very precisely. For example, the normal temperature of the human body is 98.6° F. Temperature indicating compositions can be prepared in accordance with the present invention which will indicate this temperature exactly. (See FIG. 3).

Figure 3:
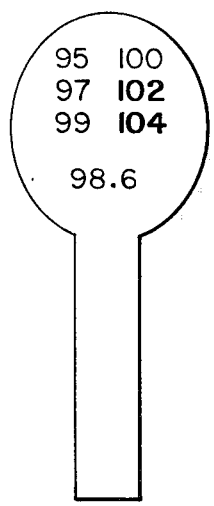
FIG. 3 is a highly schematic drawing of a disposable oral thermometer in the shape of a spoon.
Figure 4A:
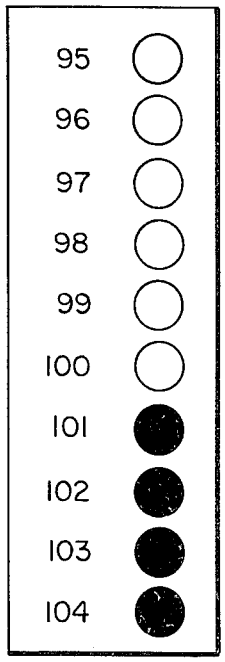
FIG. 4a and 4b are highly schematic drawings of temperature indicating devices having, respectively, color changing dots and color changing bars to indicate temperatures.
Figure 4B:
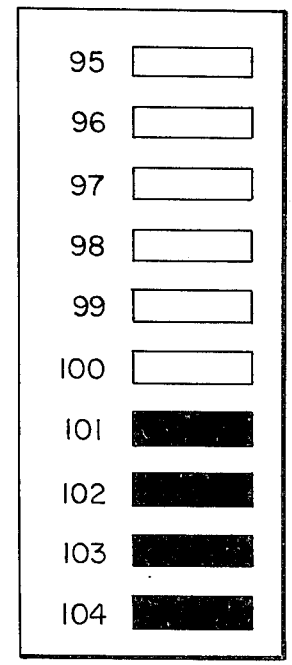

The type of thermometers illustrated by FIGS. 3 through 5 are designed to indicate the true body temperature very precisely. Such thermometers can be made very low in cost, they require no skill for utilization, they are disposable, thereby eliminating any chance of cross-infection, they require no sterilization, they eliminate the hazard of broken glass as well as the potential hazard of mercury ingestion, and they permit the patient's temperature to be taken in a matter of seconds.

For some purposes only two or three response temperatures are required, for example, to provide an indication of above normal, and below normal body temperatures. This type of temperature responsive device illustrated by FIG. 6 would permit simplified use and would satisfy the majority of the needs in a hospital or clinic. Further investigation of a patient's temperature would be required only when the temperature is abnormal.

It will be understood that other configurations of temperature responsive devices could be used. FIG. 7, for example, shows a configuration suitable for a desk thermometer. The present invention also permits an elongated strip thermometer to be made which is generally of rectangular shape and which is longitudinally divided by transverse perforations to provide multiple thermometers of uniform width and length. These thermometers can be dispensed as required from a roll, for example, used in a clinic and then disposed.

The invention is further illustrated by the following examples.

EXAMPLE I

Twenty grams of Pentalyn K, a thermoplastic ester of dimeric resin acids and pentaerythritol, having an acid number of 13, softening point of 188° C. (Hercules drop method using a bath temperature of 205° C.), a specific gravity at 25/25° C. of 1.09, a color on the USDA rosin scale of G and a weight per gallon at 25° C. of 9 pounds, is heated to 150° C. with 20 grams of cholesteryl acetate. Heating is continued until no further acetic acid is split off and the oily liquid changes to a solid. Yield of the resulting polymerized material amounts to 36.9 grams.

When dissolved in petroleum ether a printable composition is obtained which when printed on a black background is vivid red in color up to 96° F., at which temperature the composition becomes essentially colorless. The color changes almost instantaneously and will return if left a few minutes of a temperature below 96° F.

By adding cholesteryl propionate to the above formulation prior to polymerization printable compositions can be obtained which will change color at different specified temperatures.

| Parts by weight of cholesteryl propionate per 100 parts of formulation | Temperature of Color Change (° F.) |
| --- | --- |
| 0 | 96 |
| 0.35 | 97 |
| 0.46 | 98 |
| 0.54 | 98.6 |
| 0.62 | 99 |
| 0.79 | 99.5 |
| 1.00 | 100 |
| 1.16 | 100.5 |
| 1.31 | 101 |
| 1.46 | 101.5 |
| 1.56 | 102 |
| 1.74 | 103 |
| 1.89 | 104 |
| 1.98 | 105 |

EXAMPLE II

Twenty grams of tertiary butyl alpha methyl styrene is reacted with 20 grams of cholesteryl chloride at a temperature of 210° C. for 45 minutes. The resulting composition is then dissolved in petroleum ether to obtain a material which when printed on a black background will turn to a colorless or nonreflective state at a temperature of 109° F.

By adding cholesteryl linoleate to the above formulation prior to polymerization printable compositions can be obtained which will change color at different specified temperatures.

| Parts by weight of cholesteryl linoleate per 100 parts of formulation | Temperature of Color Change (° F.) |
| --- | --- |
| 0 | 109 |
| 1.62 | 105 |
| 1.84 | 104 |
| 2.24 | 103 |
| 2.48 | 102 |
| 2.69 | 101.5 |
| 3.00 | 101 |
| 3.25 | 100.5 |
| 3.46 | 100 |
| 3.74 | 99.5 |
| 3.92 | 99 |
| 4.06 | 98.6 |
| 4.92 | 98 |
| 5.29 | 97 |

EXAMPLE III

Twenty grams of phenolic resin, having a setting point of 129° C. and a 12 second viscosity, is reacted with 20 grams of cholesteryl propionate at a temperature of 200° C. for approximately 45 minutes. The resulting reaction product is then dissolved in petroleum ether to form a printable composition which changes from colored state to an essentially colorless or nonreflective state at a temperature of 96° F.

By adding cholesteryl oleate to the above formulation prior to polymerization printable compositions can be obtained which will change color at different specified temperatures.

| Parts by weight of cholesteryl oleate per 100 parts of formulation | Temperature of Color Change (° F.) |
| --- | --- |
| 0 | 96 |
| 0.39 | 97 |
| 0.52 | 98 |
| 0.61 | 98.6 |
| 0.73 | 99 |
| 0.89 | 99.5 |
| 1.01 | 100 |
| 1.23 | 100.5 |
| 1.39 | 101 |
| 1.52 | 101.5 |
| 1.76 | 102 |
| 1.89 | 103 |
| 2.06 | 104 |
| 2.36 | 105 |

EXAMPLE IV

Twenty grams of Pentalyn G, a thermoplastic maleic-modified pentaerythritol ester of rosin, having an acid number of 14, a softening point of 135° C. (Hercules drop method using a bath temperature of 150° C.), a specific gravity of 1.10 at 25/25° C., a color of N on the USDA rosin scale, and a weight per gallon of 9.1 pounds at 25° C., is heated for 90 minutes with 20 grams of cholesterol. The resulting composition when dissolved in a solvent to obtain a printable material turns colorless at the temperature of 98.5° F.

The temperature indicating compositions of the present invention can be very carefully and precisely regulated to prepare formulations which, if desired, can be controlled within plus or minus 0.02° F. Because of the nature of these compositions they always change color at very specific temperatures. The change is substantially instantaneous upon reaching a particular elevated temperature. Upon being subjected to a lower temperature for a short period of time the original color returns.

From the foregoing it will be seen that this invention is well adapted to obtain all of the ends and objects hereinabove set forth, together with other advantages which are obvious and which are inherent to the system. Not only are temperature indicating devices made in accordance with the present invention very precise, but they are economical to produce, they can be used without skill and they are disposable. Disposable thermometers are of course of great importance for utilization in clinics and hospitals in order to prevent infection and eliminate the time required for sterilization of existing clinical thermometers. With glass thermometers there is always the danger of a thermometer breaking. Another important aspect is the fact that thermometers prepared utilizing the compositions in accordance with the present invention respond very rapidly, in a matter of seconds. The temperature indicating device can also be used as an inexpensive, reliable and easy to use temperature measuring instrument in determining the temperature of bath water, foods (especially infant nutrients), incubators, and the like. Another important application is the use of small indicators printed on frozen food containers to monitor safe conditions of frozen food storage. Indicators can likewise be placed on wine bottles to tell the correct pouring temperature recommended for each type of wine. Mixing rods or stirrers having temperature indicating compositions can be used to indicate the temperature of a mixture being stirred. Moreover, temperature indicating compositions can be used to indicate if a cold beverage is truly cold or if a hot liquid is too hot to drink.

While primary emphasis has been placed on the utilization of the compositions of the present invention for thermal indicating devices, it should be apparent that the compositions can be utilized for other purposes. For example, for dramatic effect walls can be covered with material which changes color with changes in temperature; billboard advertising could be made to change with seasonal changes, etc. Another application is that of nail polish which changes color with changes in temperature.

Obviously, many other modifications and variations of the invention as hereinbefore set forth can be made without departing from the spirit and scope thereof.

What is claimed is:

1. A printable composition comprising a polymeric material dissolved in petroleum ether, said polymeric material being formed by heating a cholesteryl ester material comprising cholesteryl acetate with a thermoplastic ester of dimeric resin acid and pentaerythritol at a temperature of 150° C until no further acetic acid is formed and the oily liquid changes to a solid.

2. The printable composition of claim 1 in which cholesteryl propionate is added to the cholesteryl acetate prior to the formation of the polymeric material.

3. A temperature indicating device comprising temperature sensitive materials applied to a substrate to form a plurality of markings thereon, each marking having a different temperature sensitivity, said temperature sensitive materials being formed by heating cholesteryl acetate with a thermoplastic ester of dimeric resin acid and pentaerythritol in the presence of varying amounts of cholesteryl propionate at a temperature of 150° C until no further acetic acid is formed and the oily liquid changes to a solid.

4. The temperature indicating device of claim 3 wherein the substrate is polyvinyl chloride and wherein a protective layer of substantially transparent plastic film covers the temperature sensitive materials which are applied to the substrate.

5. The process of preparing a temperature sensitive device comprising a substrate, a temperature sensitive composition applied to at least one surface of the substrate and a transparent protective covering over the temperature sensitive composition, which process comprises preparing a printable composition comprising a polymeric material dissolved in petroleum ether wherein said polymeric material is formed by heating a cholesteryl ester material comprising cholesteryl acetate with a thermoplastic ester of dimeric resin acid and pentaerythritol at a temperature of 150° C until no further acetic acid is formed and the oily liquid changes to a solid, applying the printable composition to the substrate and covering the temperature sensitive composition with a transparent protective coating.

6. The process of claim 5 in which cholesteryl propionate is added to the cholesteryl acetate prior to the formation of the polymeric material.

* * * * *